United States Patent Office

JAMES T. STEWART, OF PEORIA, ASSIGNOR TO SAMUEL R. WHITLOW, OF ROCHESTER, ILLINOIS.

Letters Patent No. 73,552, dated January 21, 1868.

IMPROVED MEDICAL COMPOUND.

*The Schedule referred to in these Letters Patent and making part of the same.*

TO ALL WHOM IT MAY CONCERN:

Be it known that I, JAMES T. STEWART, of Peoria, in the county of Peoria, and State of Illinois, have invented a new and improved Medical Compound; and I do hereby declare that the following is a full, clear, and exact description thereof, which will enable those skilled in the art to compound and use the same.

My invention has for its object to furnish an improved tonic stomach-bitter, and, as a secondary effect, blood-purifier, which is applicable in all cases of debility, especially those resulting from and following ague and other malarial fevers, and which may be taken freely, and for a great length of time, without producing headache or other unpleasant symptoms. It also counteracts the effect of malaria upon the system, thereby preventing ague and other fevers. It also acts as an appetizer, and benefits those suffering from chronic diseases which have produced a debilitated condition of the system; and is especially beneficial in consumption.

My invention consists of the compound prepared of the ingredients and in the proportions and manner hereinafter more fully described and set forth.

The ingredients, and the proportions of each used in this compound, are as follows: Whiskey, one gallon; water, one half gallon; white sugar, one half pound; tincture of orange-peel, four ounces; tincture of gentian, (compound,) two ounces; tincture of cardamom, (compound,) two ounces; tincture of curcuma, two ounces; and oil of lemon, sixty-four drops.

In preparing the compound, I first cut the oil of lemon with a little alcohol, and add it to the whiskey; I then dissolve the white sugar in the water, and add the solution, with the other ingredients, to the oil of lemon and whiskey. The compound is then filtered, which completes the process.

Having thus described my new and improved medical compound, I claim as new, and desire to secure by Letters Patent—

An improved medical compound, prepared of the ingredients, and in the proportions and manner substantially as herein set forth and described.

The above specification of my invention signed by me, this 9th day of November, 1867.

JAMES T. STEWART.

Witnesses:
H. C. FURSMAN,
WM. T. MURRAY.